United States Patent
Jeon (10) Patent No.: US 9,041,637 B2
(45) Date of Patent: May 26, 2015

(54) DISPLAY DEVICE INCLUDING SWITCHING ELEMENTS AND METHOD FOR DRIVING THE DISPLAY DEVICE

(71) Applicant: Samsung Display Co., Ltd., Yongin, Gyeonggi-Do (KR)

(72) Inventor: Sang Jin Jeon, Suwon-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 273 days.

(21) Appl. No.: 13/735,738

(22) Filed: Jan. 7, 2013

(65) Prior Publication Data
US 2014/0085559 A1   Mar. 27, 2014

(30) Foreign Application Priority Data
Sep. 25, 2012  (KR) .......................... 10-2012-0106378

(51) Int. Cl.
G02F 1/136     (2006.01)
G09G 3/36      (2006.01)
G02F 1/133     (2006.01)
G02F 1/1362    (2006.01)
G02F 1/1343    (2006.01)

(52) U.S. Cl.
CPC ........ *G02F 1/13306* (2013.01); *G02F 1/13624* (2013.01); *G09G 3/3648* (2013.01); *G02F 2001/134345* (2013.01)

(58) Field of Classification Search
CPC ..... G09G 3/36; G09G 3/3611; G09G 3/3614; G09G 3/3648; G09G 3/3655; G09G 3/3659; G09G 3/3674–3/3696; G09G 2300/08–2300/0895; G02F 1/13624; G02F 1/13306; G02F 2001/136245; G02F 2001/134345

USPC ................................... 345/87–97; 349/42–47
See application file for complete search history.

(56) References Cited

U.S. PATENT DOCUMENTS

| | | | |
|---|---|---|---|
| 5,825,343 A | 10/1998 | Moon | |
| 7,683,979 B2 | 3/2010 | Wang et al. | |
| 2005/0225519 A1* | 10/2005 | Naugler, Jr. | ..... 345/77 |
| 2011/0013105 A1* | 1/2011 | Jung et al. | ..... 349/38 |
| 2011/0128210 A1 | 6/2011 | Jung et al. | |
| 2011/0267567 A1 | 11/2011 | Ting et al. | |
| 2012/0019754 A1 | 1/2012 | Ting et al. | |

(Continued)

FOREIGN PATENT DOCUMENTS

| | | |
|---|---|---|
| JP | 2006-276411 A | 10/2006 |
| JP | 2012-003229 A | 1/2012 |
| KR | 10-2008-0057793 A | 6/2008 |

(Continued)

*Primary Examiner* — Nathan Danielsen
(74) *Attorney, Agent, or Firm* — Innovation Counsel LLP (57) ABSTRACT

A display device includes: a gate line transmitting a gate line; a data line transmitting a data voltage; a first switching element and a second switching element connected to the gate line and the data line; a third switching element connected between the second switching element and a terminal providing a first reference voltage signal; a first liquid crystal capacitor connected to the first switching element; and a second liquid crystal capacitor connected to the second switching element, wherein the third switching element includes a first control terminal connected to the gate line and a second control terminal connected to a terminal providing a second reference voltage signal. The second and third switching elements are operated to form a voltage dividing network having a respective voltage dividing ratio.

20 Claims, 8 Drawing Sheets

(56) References Cited

U.S. PATENT DOCUMENTS

2012/0105785 A1* 5/2012 Kim et al. .................... 349/139
2013/0077002 A1* 3/2013 Yoon et al. .................... 349/38

FOREIGN PATENT DOCUMENTS

| KR | 10-2011-0001862 A | 1/2011 |
| KR | 10-2012-0054444 A | 5/2012 |

* cited by examiner

DISPLAY DEVICE INCLUDING SWITCHING ELEMENTS AND METHOD FOR DRIVING THE DISPLAY DEVICE

CROSS-REFERENCE TO RELATED APPLICATION

This application claims priority to and the benefit of Korean Patent Application No. 10-2012-0106378 filed in the Korean Intellectual Property Office on Sep. 25, 2012, the entire contents of which application are incorporated herein by reference.

BACKGROUND (a) Field of Disclosure

The present disclosure of invention relates to a display device and a driving method thereof. More particularly, the present invention relates to a display device capable of improving visibility and a driving method thereof.

(b) Description of Related Technology

Display devices such as liquid crystal displays (LCDs), organic light emitting device based (OLED) displays and so on generally include a display panel that includes a plurality of pixel units each including one or more switching elements and a corresponding plurality of signal lines coupled to the respective switching elements. The panel-based display devices will also typically include a gray scale voltages generator that generates gray scale reference voltages, a data lines driver that uses the generated gray scale reference voltages to generate a corresponding plurality of gray scale drive voltages and to apply the gray scale drive voltages to respective data lines in accordance with a supplied input image signal.

One form of liquid crystal display (LCD) device includes two spaced apart display panels, a first having pixel electrodes driven by the switching elements and a second having opposed electrodes that cooperate with the pixel electrodes to generate respective electric fields. A liquid crystal material layer is interposed between the first and second panels and is configured to have a dielectric anisotropy. The pixel electrodes are arranged as a matrix and are connected to respective switching elements such as to respective thin film transistors (TFTs) or the like. The pixel electrodes sequentially receive corresponding data drive voltages on a column-by-column and/or row-by-row basis. The opposed electrodes are formed on the opposed panel and are typically supplied with a predetermined common voltage Vcom. Voltages applied to the pixel electrodes and to the opposed electrodes generate respective electric fields extending into the liquid crystal layer. The strengths of these electric fields may be controlled so as to thereby control one or more attributes (e.g., polarization) of light being transmitted through the liquid crystal layer, to thereby obtain desired images.

A problem with the liquid crystal displays is that they tend to have reduced side view visibility as compared to head-on frontal visibility. In order to overcome this problem, one method divides each pixel into two corresponding subpixels and applies different voltages to the two subpixels so as to thereby form different liquid crystal domains that can be respectively better seen in a frontal view and a side view. With only two subpixels per pixel there appears to be a limit as to how many different liquid crystal domains can be generated during each of plural image frames. The present disclosure shows that this need not be so.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

The present disclosure of invention provides a display device having a capability of improving display quality by controlling how many different liquid crystal domains can be generated by each pixel unit during each of plural image frames so to thereby improve side view visibility. A driving method therefor is also disclosed.

An exemplary embodiment of the present invention provides a display device, including: a gate line transmitting a gate line; a data line transmitting a data voltage; a first reference voltage providing line configured for transmitting a corresponding first reference voltage signal; a second reference voltage providing line configured for transmitting a corresponding second reference voltage signal; a first switching element and a second switching element connected to the gate line and the data line; a third switching element connected between the second switching element and a terminal of a first reference voltage; a first liquid crystal capacitor connected to the first switching element; and a second liquid crystal capacitor connected to the second switching element, wherein the third switching element includes a first control terminal connected to the gate line and a second control terminal connected to a terminal of the second reference voltage. The second and third switching elements are operable to form a voltage dividing network.

The first control terminal and the second control terminal may face each other with respect to a channel of the third switching element.

The first reference voltage may be an AC voltage and the second reference voltage may be a DC voltage.

The first reference voltage may have polarity inverted by frames.

The first reference voltage may swing between a high reference voltage that is equal to or greater than a maximum voltage of the data voltage and a low reference voltage that is equal to or less than a minimum voltage of the data voltage.

The first reference voltage may be the high reference voltage when the data voltage is positive with respect to a common voltage and may be the low reference voltage when the data voltage is negative with respect to the common voltage.

The second reference voltage may be a threshold voltage of the third switching element or more.

The high reference voltage may be approximately 12V and the low reference voltage may be approximately −2V.

The first reference voltage may be a DC voltage.

The second reference voltage may be a voltage that turns off the third switching element.

The second reference voltage may be a DC voltage or an AC voltage that has a value in a range from about −12V to about −2V.

The display device may further include: a second reference voltage line that transmits the second reference voltage, wherein the second reference voltage line overlaps the data line.

The second liquid crystal capacitor may further include a second subpixel electrode that is disposed on the second switching device, wherein the second reference voltage line and the second subpixel electrode are disposed in a same layer.

Another exemplary embodiment provides a method of driving a display device including a first switching element and a second switching element connected to a gate line and a data line; a third switching element connected between the second switching element and a terminal of a first reference voltage; a first liquid crystal capacitor connected to the first switching element; and a second liquid crystal capacitor connected to the second switching element, the method including: applying a data voltage to the first liquid crystal capacitor by conducting the first switching element, the second switching element, and the third switching element and applying a divided voltage produced by voltage dividing network formed by the second and third switching elements to the second liquid crystal capacitor; and blocking the first switching element and the second switching element and controlling leakage current of the third switching element, wherein the third switching element includes a first control terminal connected to the gate line and a second control terminal connected to a terminal of a second reference voltage and the controlling of the leakage current of the third switching element includes controlling at least one of the first reference voltage and the second reference voltage.

The first control terminal and the second control terminal may face each other with respect to a channel of the third switching element.

The first reference voltage may be an AC voltage and the second reference voltage may be a DC voltage.

The first reference voltage may have polarity inverted by frames.

The first reference voltage may swing between a high reference voltage that is equal to or greater than a maximum voltage of the data voltage and a low reference voltage that is equal to or less than a minimum voltage of the data voltage.

The first reference voltage may be a DC voltage.

The second reference voltage may be a voltage that turns off the third switching element.

According to the exemplary embodiments of the present disclosure of invention, it is possible to improve the display quality of the display device by controlling the transmittance while improving the side view visibility of the display device.

DETAILED DESCRIPTION

The present disclosure of invention will be provided more fully hereinafter with reference to the accompanying drawings, in which exemplary embodiments are shown. As those skilled in the art would realize in view of the present teachings, the described embodiments may be modified in various different ways, all without departing from the spirit or scope of the present teachings.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Hereinafter, a display device and a driving method thereof according to an exemplary embodiment will be described with reference to the accompanying drawings.

First, a display device according to an exemplary embodiment of the present disclosure of invention will be described with reference to FIGS. 1 to 3.

Figure 1:
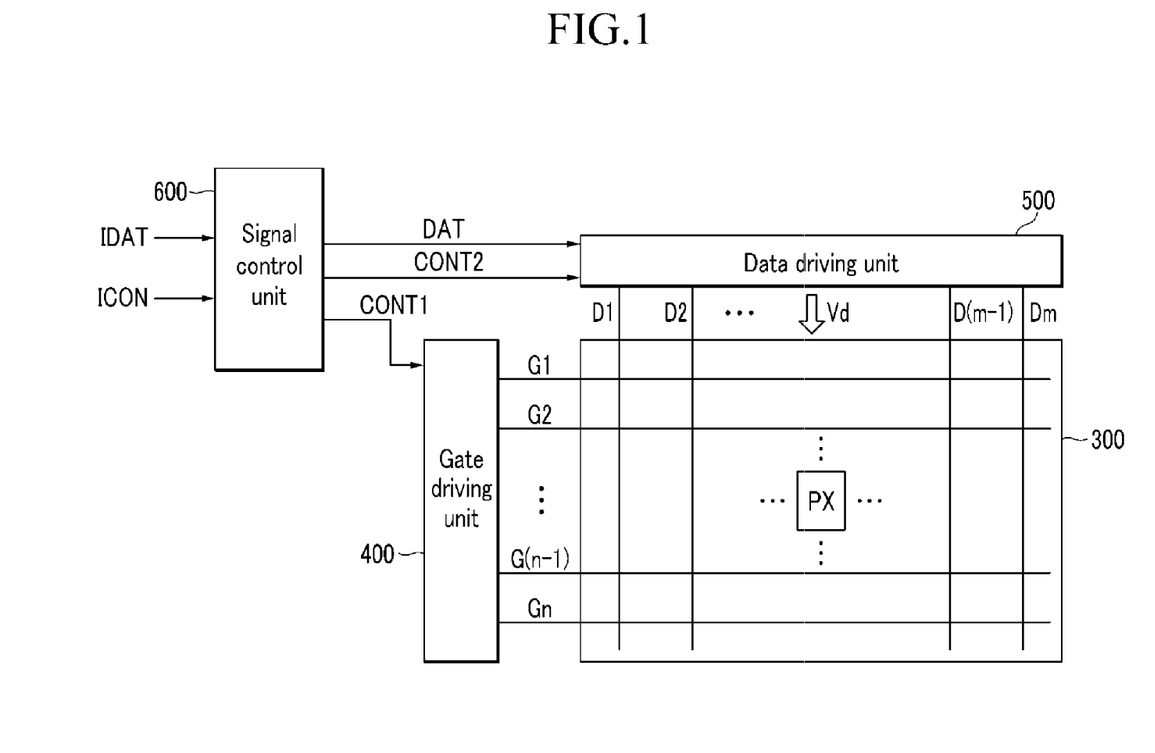
FIG. 1 is a block diagram illustrating a display device according to an exemplary embodiment of the present disclosure.

FIG. 1 is a block diagram illustrating a display device according to an exemplary embodiment. FIG. 2 is an equivalent circuit diagram illustrating a pixel unit of the display device according to the exemplary embodiment. FIG. 3 is a timing diagram illustrating a driving signal of the display device according to the exemplary embodiment.

Referring to FIG. 1, a display device according to an exemplary embodiment includes a display panel 300, a gate lines driver circuit 400 and a data lines driver circuit 500 each connected to the display panel 300, and a controller 600 configured and connected for controlling them.

When viewed from an equivalent circuit perspective, the display panel 300 includes a plurality of signal lines and a plurality of pixel units PX connected therewith and arranged in accordance with a predetermined matrix format. When the display device according to the exemplary embodiment is a liquid crystal display (LCD) type, the display panel 300 may include lower and upper panels (not illustrated) facing each other and a liquid crystal layer (not illustrated) disposed therebetween, when being viewed from a side sectional view. Alternatively, the display device may be an OLED type and may employ some of the concepts disclosed herein (in particular a dual gated control transistor Qr as shall be detailed shortly).

The signal lines that operatively couple to the respective pixel units includes a plurality of gate lines G1 to Gn that transmit corresponding gate signals (also referred to as scanning signals) and a plurality of data lines D1 to Dm that transmit data voltages. Although not shown in FIG. 1 it will become apparent below that additionally, the signal lines include first and second reference voltage transmitting lines (conveying corresponding first and second reference voltages Vst1 and Vst2).

Figure 2:
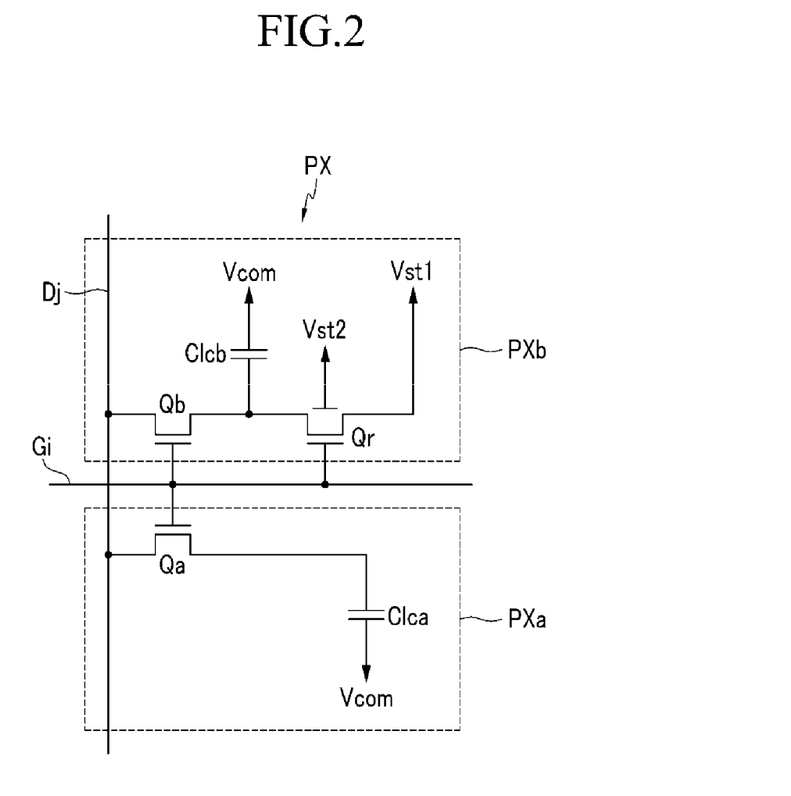
FIG. 2 is an equivalent circuit diagram illustrating a sample pixel unit among the plural pixel units of the display device where the pixel unit is capable of being variously controlled so as to generate different liquid crystal domains during each of plural image frames so as to thereby improve side view visibility.

Referring to FIG. 2, one exemplary pixel unit PX of the display device includes at least a first subpixel section PXa and a second subpixel section PXb. The first subpixel section PXa includes a first switching element Qa connected to a data line Dj and connected to a respective gate line Gi. The first subpixel section PXa further includes a first liquid crystal capacitor Clca connected to the first switching element Qa at one end thereof and operatively coupled to the Vcom voltage at another end thereof. The second subpixel section PXb includes a second switching element Qb connected to the respective data line Dj of the pixel unit and also connected to the respective gate line Gi. The second subpixel section PXb further includes a dual-gated and so-called, divider-forming switching element Qr, and a second liquid crystal capacitor Clcb connected therewith as well as with the second switching element Qb and with the Vcom voltage.

The first switching element Qa may be a three terminal one such as a one-gate thin film transistor (TFT), and the like, which includes a control (gate) terminal connected to the gate line Gi, an input (source) terminal connected to the data line Dj, and an output (drain) terminal connected to the first liquid crystal capacitor Clca. The first switching element Qa may be controlled according to the gate signal transmitted by the gate line Gi. When switched into a fully ON state, the first switching element Qa transmits a data voltage then supplied by the data line Dj to the corresponding plate (subpixel electrode, not shown) of the first liquid crystal capacitor Clca.

The second switching element Qb may be a three terminal one such as a one-gate thin film transistor (TFT), and the like, which includes a respective control terminal connected to the gate line Gi, a respective input terminal connected to the data line Dj, and a respective output terminal connected to the second liquid crystal capacitor Clcb (to the corresponding subpixel electrode, not yet shown). The respective output terminal of the second switching element Qb is further connected to the divider-forming switching element Qr and when both of the second switching element Qb and the divider-forming switching element Qr are in respective conductive states, they can form a voltage divider network as shall be better appreciated from the below further description. The conductive state of the second switching element Qb may be controlled in a binary manner (ON or OFF) according to a binary gate signal transmitted by the gate line Gi.

The divider-forming switching element Qr is a four terminal element such as in the form of a dual gated thin film transistor (2GTFT), and the like. The divider-forming switching element Qr includes a respective input (source) terminal connected to the output terminal of the second switching element Qb and an output (drain) terminal connected to a first reference voltage carrying line, Vst1. The divider-forming switching element Qr further includes respective first and second and control (gate) terminals separated from each other. The first control terminal of the divider-forming switching element Qr is connected to the gate line Gi while the respective second control terminal is connected to a second reference voltage carrying line Vst2. The conductive state of the divider-forming switching element Qr is variably controlled (in a semi-digital, semi-analog manner) according to the binary gate signal transmitted by the gate line Gi and by the analog second reference voltage Vst2 provided by the corresponding second voltage carrying line (also denoted as Vst2). When the divider-forming switching element Qr and the second switching element Qb are both switched into respective conductive states, a voltage divider network is formed having the data voltage then transmitted by the data line Dj at one end and having the first reference voltage Vst1 at the other end. The output of this voltage divider network may be transmitted to the second liquid crystal capacitor Clcb.

As such, in the display device according to the exemplary embodiment of the present disclosure, the first reference voltage Vst1 and the second reference voltage Vst2 may be variously controlled and the output of the voltage divider network (formed by simultaneously turning on both of Qb and Qr) may be variously controlled. The present disclosure is not limited to simultaneously turning on both of Qb and Qr. Alternatively or additionally, Qr may be temporally and partially turned on before or after Qb is turned on and then off.

Figure 3:
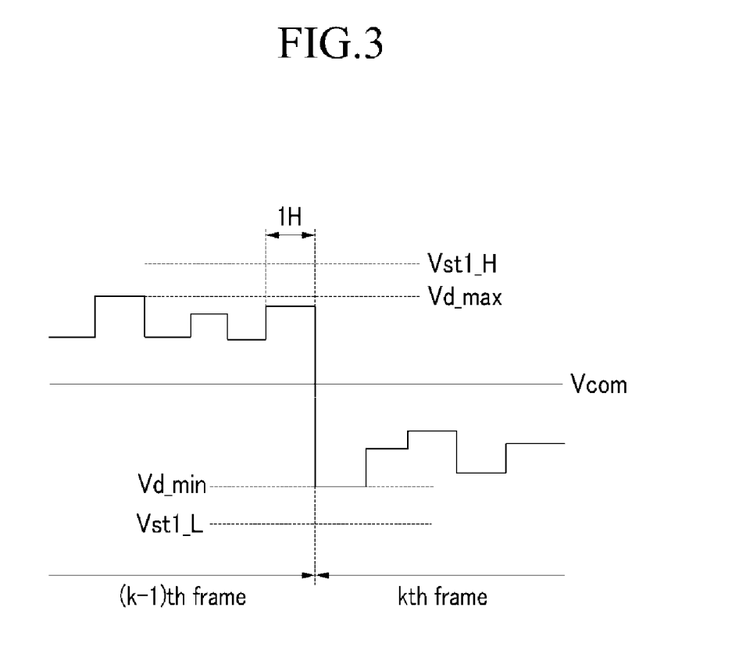
FIG. 3 is a timing diagram illustrating a per frame polarity reversal scheme and corresponding driving signals of the display device according to the exemplary embodiment.

In an example method of use, as illustrated in FIG. 3, the first reference voltage Vst1 may be provided as an alternating AC voltage (e.g., as a square wave having opposed polarity levels Vst1H and Vst1L) and the second reference voltage Vst2 may be provided as predetermined and fixed DC voltage which further controls the resistance of Qr when Gi is fully turned on.

In terms of more detail, the first reference voltage Vst1 may be an AC voltage that swings between a predetermined high reference voltage level Vst1_H that is equal to or greater than a maximum voltage level Vd_max of the data voltages and a predetermined low reference voltage level Vst1_L that is equal to or less than a minimum voltage level Vd_min of the data voltage (e.g., the most negative relative to Vcom). For example, the high reference voltage Vst1_H may be approximately +12V and the low reference voltage Vst1_L may be approximately −2V where Vcom is +5V (resulting in a 7 volt swing above or below Vcom). A swing period of the first reference voltage Vst1 may be one frame. Here, a level of the first reference voltage Vst1 may be relatively constant and changed only when switching from one frame to the next.

A magnitude of the second reference voltage Vst2 may be equal to a threshold voltage Vth of the divider-forming switching element Qr or more and may be larger than 0V. When the gate signal applied to the first control terminal of the divider-forming switching element Qr is a gate-off voltage Voff, the second reference voltage Vst2 may be a voltage where the divider-forming switching element Qr operates in a linear region and the magnitude of Vst2 thus determines a relative resistance of Qr versus that of Qb and thus determines a voltage divider ratio provided by the combination of Qr and Qb when both are simultaneously conductive (when the gate line voltage on Gi is high and Vst2 is above the threshold level of its portion of the transistor channel region).

According to another exemplary embodiment, the first reference voltage Vst1 may remain as a DC voltage level. For example, the first reference voltage Vst1 may be a common voltage Vcom, and the like, wherein the common voltage Vcom may be approximately +5V. It is possible to control the amount and direction of leakage current by controlling a magnitude of the second reference voltage Vst2 together with the magnitude of the first reference voltage Vst1. The second reference voltage Vst2 may be a DC voltage or an AC voltage. For example, the second reference voltage Vst2 may be a DC voltage in a range from about +12 V to about −2V or an AC voltage that swings between approximately +12V and approximately −2V. With some settings, the first reference voltage Vst1 and the second reference voltage Vst2 may be used to turn off the divider-forming switching element Qr so that the leakage current through the divider-forming switching element Qr may be substantially 0.

The first subpixel section PXa and the second subpixel section PXb may then display images according to different gamma curves with respect to a single input image signal IDAT and may also display images according to the same gamma curve. Here, the gamma curve means a curved graph plot that represents luminance or transmittance for the gray scale represented by the input image signal (IDAT).

According to the exemplary embodiment of the present disclosure, the gamma curve according to the second subpixel section (PXb) may be controlled by controlling a resistance ratio of the second switching element Qb to that of the divider-forming switching element Qr and the first reference voltage Vst1, the second reference voltage Vst2, and the like. As described above, the charging voltage of the second liquid crystal capacitor Clcb may be controlled by controlling the divider-forming switching element Qr, the first reference voltage Vst1, the second reference voltage Vst2, and the like, to make the luminance of the two subpixel sections PXa and PXb different and when the voltage (referred to as "pixel voltage") charged in the first liquid crystal capacitor Clca and the voltage charged in the second liquid crystal capacitor Clcb are appropriately controlled, an image viewed from the side view may approximate an image viewed from the front as maximally as possible, thereby improving side view visibility.

Further, the first reference voltage Vst1 and the second reference voltage Vst2 connected to the divider-forming switching element Qr are controlled by controlling the amount and direction of leakage current of the divider-forming switching element Qr, such that the voltage charged in the second liquid crystal capacitor Clcb and the luminance of the second subpixel PXb can be controlled. For example, when the voltage charged in the second liquid crystal capacitor Clcb is controlled toward a direction in which the luminance is increased, the luminance, that is, transmittance of the second subpixel PXb is increased, thereby increasing the overall transmittance of the image that is displayed by the display device.

Areas of the first subpixel in section PXa and of the second subpixel in section PXb may be equal to or different from each other.

Referring again to FIG. 1, the gate lines driver circuit 400 (e.g., formed of one or more monolithically integrated circuit chips) is connected to the gate lines G1 to Gn to apply corresponding gate signals each configured of a combination of a gate-on voltage level Von and a gate-off voltage level Voff.

The data lines driver circuit 500 (e.g., formed of one or more monolithically integrated circuit chips) is connected to the data lines D1 to Dm and respectively selects for each data line and each time slot (e.g., 1H) a respective gray voltage corresponding to the input image signal IDAT and applies the selected gate voltage to the respective one of data lines D1 to Dm as a respective analog data voltage. The data driver 500 may also be supplied with reference gray voltages for defining the entire set of gray scale voltages from a gray reference voltage generator (not illustrated), and the like, to divide the voltage, thereby generating the gray voltage for the entire gray scale spectrum.

The gate lines driver 400 and the data lines driver 500 may also be connected to the display panel 300 by being directly mounted on the display panel 300 in at least one IC chip type, bonded to the display panel 300 in a tape carrier package (TCP) type, or mounted on a printed circuit board (PCB) (not illustrated).

A signal controller 600 controls an operation of the gate lines driver 400, the data lines driver 500, and the like.

A display operation of the display device will now be described with reference to FIGS. 1 to 3.

The signal controller 600 receives the input image signal IDAT and an input control signal ICON controlling the display thereof from the outside. The input image signal IDAT includes digital luminance information for each pixel unit PX and the digital luminance value has a corresponding gray scale luminance corresponding to it (to its defined digital number). As the input control signal (ICON), there are a vertical synchronizing signal and a horizontal synchronizing signal, a main clock signal, a data enable signal, and the like.

The signal controller 600 processes the input image signal IDAT based on the input image signal IDAT and the input control signal ICON for one frame and converts the processed input image signal into the output image signal DAT to generate a gate control signal CONT1, a data control signal CONT2, and the like. The signal controller 600 transmits the gate control signal CONT1 to the gate lines driver 400 and transmits the data control signal CONT2 and the output image signal DAT to the data lines driver 500.

The data lines driver 500 receives the output image signal DAT for the pixel PX of one row according to the data control signal CONT2 from the signal controller 600 and selects the appropriate gray voltage corresponding to each output image signal DAT to convert the output image signal DAT into a corresponding analog data voltage and apply that voltage to the corresponding one (Dj) of data lines D1 to Dm.

The gate lines driver 400 sequentially applies the gate-on voltage level Von to the gate lines G1 to Gn according to the gate control signal CONT1 from the signal controller 600 to turn on corresponding channel portions of the switching elements Qa, Qb, and Qr connected therewith. The data voltage applied to the data lines D1 to Dm is applied to the first liquid crystal capacitor Clca through the turned on first switching element Qa. The terminal connected to the second switching element Qb among the terminals of the second liquid crystal capacitor Clcb is applied with the divided voltage between the applied data voltage and the applied first reference voltage Vst1. The voltage applied to the second liquid crystal capacitor Clcb may be changed according to a voltage difference between the applied data voltage and the applied first reference voltage Vst1 due to the respective resistances of the turned on second switching element Qb and the turned on divider-forming switching element Qr, and due to the level of the applied first reference voltage Vst1, and the like.

Unlike the one level illustrated in FIG. 3, the level of the first reference voltage Vst1 may be set to be a voltage between Vst1H and the common voltage Vcom, and the like, for the charging time when the gate-on voltage Von is applied to each gate line G1 to Gn, such that the voltage applied to the terminal of the second liquid crystal capacitor Clcb may be a voltage closer to the common voltage Vcom rather than higher than the data voltage. Therefore, the charging voltage of the second liquid crystal capacitor Clcb may be smaller than that of the first liquid crystal capacitor Clca for the charging time of the gate-on voltage Von.

During a period when the application of the gate-on voltage Von to each gate line G1 to Gn ends, the gate-off voltage Voff is applied thereto, and then, the corresponding frame ends, the first reference voltage Vst1 may be the high reference voltage Vst1_H that is equal to or greater than the maximum voltage Vd_max of the data voltage or the low reference voltage Vst1_L that is equal to or less than the minimum voltage Vd_min of the data voltage as described above. Further, after the charging time, the value of the first reference voltage Vst1 may be changed for each frame.

The first liquid crystal capacitor Clca may be charged by an amount of charge corresponding to the difference between the data voltage and the common voltage Vcom and the second liquid crystal capacitor Clcb may be charged by an amount of charge corresponding to the difference between the divided voltage between the data voltage and the common voltage Vcom and the common voltage Vcom. The charging voltage of the second liquid crystal capacitor Clcb may thus be made different from the charging voltage of the first liquid crystal capacitor Clca, such that the luminance of the first and second subpixels PXa and PXb may be different. The luminance of the first subpixel PXa and the luminance of the second subpixel PXb follow different gamma curves and the synthesized gamma curve of the two gamma curves approximate a front gamma curve as maximally as possible, thereby improving the side visibility of the display device. In particular, the value of the first reference voltage Vst1 becomes the common voltage Vcom for the charging time of the gate-on voltage Von, such that the luminance of the second subpixel PXb may be smaller than that of the first subpixel PXa.

When the gate-off voltage Voff is applied to the gate lines G1 to Gn, the first and second switching elements Qa and Qb become turned off.

According to the exemplary embodiment under discussion, when the gate-off voltage Voff is applied to the gate lines G1 to Gn, the second reference voltage Vst2 smaller than the gate-on voltage Von and larger than the threshold voltage Vth of the divider-forming switching element Qr may still be applied to the second control terminal among the control terminals of the divider-forming switching element Qr and the divider-forming switching element Qr may be operating in a linear region even though Voff is applied to its first gate electrode. Like the k–1-th frame illustrated in FIG. 3, when the data voltage and the first reference voltage Vst1 are positive polarity (+) with respect to the common voltage Vcom, a positive charge may flow in the terminal of the second liquid crystal capacitor Clcb through the divider-forming switching element Qr and the charging voltage of the second liquid crystal capacitor Clcb may be increased. Therefore, the transmittance of the second subpixel PXb may grow to be larger than the level attained in the initial charging time.

Similarly, like the k–1-th frame illustrated in FIG. 3, when the data voltage and the first reference voltage Vst1 are negative polarity (–) with respect to the common voltage Vcom, a negative charge may flow in the terminal of the second liquid crystal capacitor Clcb through the divider-forming switching element Qr and the charging voltage of the second liquid crystal capacitor Clcb may be increased. Therefore, the transmittance of the second subpixel PXb may grow to be larger over time than that established in the charging time.

The process is repeated by setting a 1 horizontal period [written as "1H" and the same as one period of a horizontal synchronizing signal Hsync and a data enable signal DE] to be a unit, such that the gate-on voltage Von is sequentially applied to all the gate lines G1 to Gn and the data voltage is applied to all the pixels PX, thereby displaying the image for one frame.

When one frame ends and the next frame starts, a state of an inversion signal included in a data control signal CONT2 (referred to as frame inversion) may be controlled so that the polarity of the data voltage applied to each pixel PXs is opposite to the polarity of a previous frame. The polarities of the data voltage flowing through one of the data lines D1 to Dm according to characteristics of the inversion signal are periodically changed even within one frame or the polarities of the data voltage applied to the data lines D1 to Dm of one pixel row may be different.

According to another exemplary embodiment, unlike the one illustrated in FIG. 3, the first reference voltage Vst1 is a DC voltage such as common voltage Vcom, and the like, and the second reference voltage Vst2 may be an AC voltage or a DC voltage lower than a threshold voltage Vth of the divider-forming switching element Qr. According to another exemplary embodiment, the amount and direction, and the like, of leakage current through the divider-forming switching element Qr may be controlled during the application of the gate-off voltage Voff to the gate lines G1 to Gn by controlling the magnitude of the first reference voltage Vst1 and the second reference voltage Vst2 at the times that Voff is applied. For example, the leakage current through the divider-forming switching element Qr may be substantially 0 by controlling the first reference voltage Vst1 and the second reference voltage Vst2 and the charging voltage of the second liquid crystal capacitor Clcb may be increased by the divider-forming switching element Qr.

According to an exemplary embodiment, in the pixel unit PX including the divider-forming switching element Qr, the output terminal of the divider-forming switching element Qr is connected to the first reference voltage Vst1 and the second control terminal is connected to the second reference voltage Vst2 and the luminance of the second liquid crystal capacitor Clcb may be controlled and the side view visibility may be optimized by controlling at least one of the first reference voltage Vst1 and the second reference voltage Vst2.

The method of controlling the first reference voltage Vst1 and the second reference voltage Vst2 is not limited to several exemplary embodiments but may be variously changed. For example, at least one of the first reference voltage Vst1 and the second reference voltage Vst2 may be inverted for each frame. Further, at least one of the first reference voltage Vst1 and the second reference voltage Vst2 may have constant voltage for one frame and may also have varying voltage. When at least one of the first reference voltage Vst1 and the second reference voltage Vst2 has voltage changed for one frame, the reference may be at the time when the gate-off voltage Voff is applied to the gate lines G1 to Gn or after the time.

Further, the method of controlling the luminance of the second liquid crystal capacitor Clcb is not limited to the foregoing several exemplary embodiments and may be variously changed. For example, the luminance of the second liquid crystal capacitor Clcb can be controlled so as to be increased by controlling the first reference voltage Vst1 and the second reference voltage Vst2 during the application of the gate-off voltage Voff to the gate lines G1 to Gn, such that the transmittance of the display device may be increased and the side visibility may be optimized. Unlike this, the luminance of the second liquid crystal capacitor Clcb may be controlled to be constant or reduced for the corresponding frame.

The exemplary embodiment described until now describes a liquid crystal display of a normally black mode, but is not limited thereto and may also be applied to a liquid crystal display of a normally white mode. In this case, the foregoing first reference voltage Vst1 and second reference voltage Vst2 may have a value obtained by inverting the foregoing value with respect to the common voltage Vcom.

Figure 5:
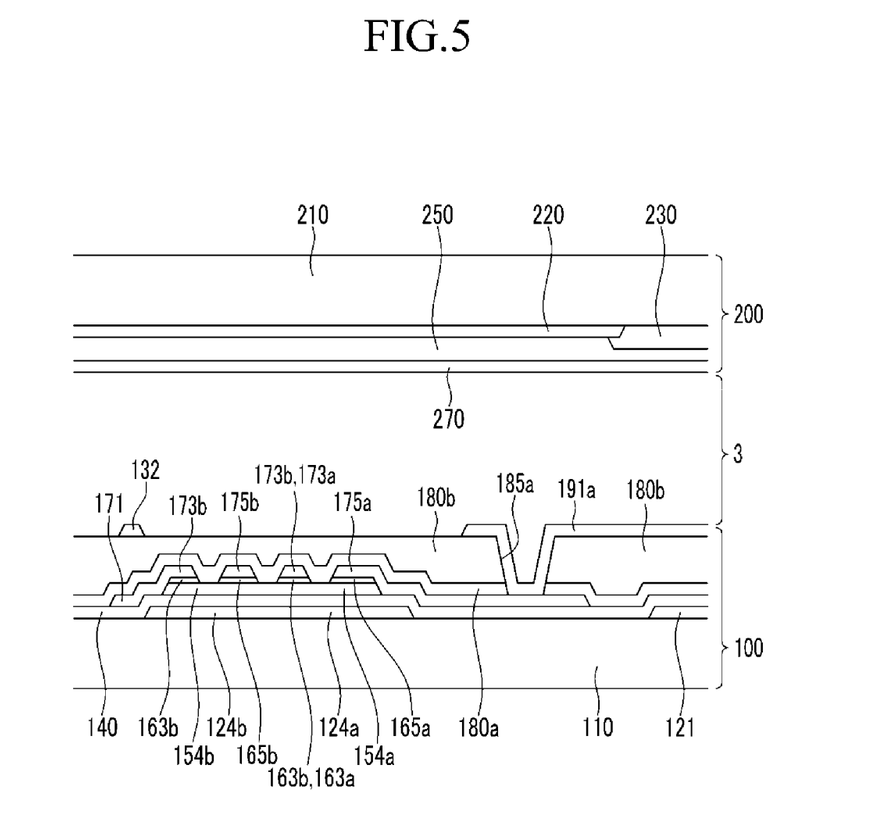
FIG. 5 is a cross-sectional view taken along the line V-V of the display device of FIG. 4.
Figure 6:
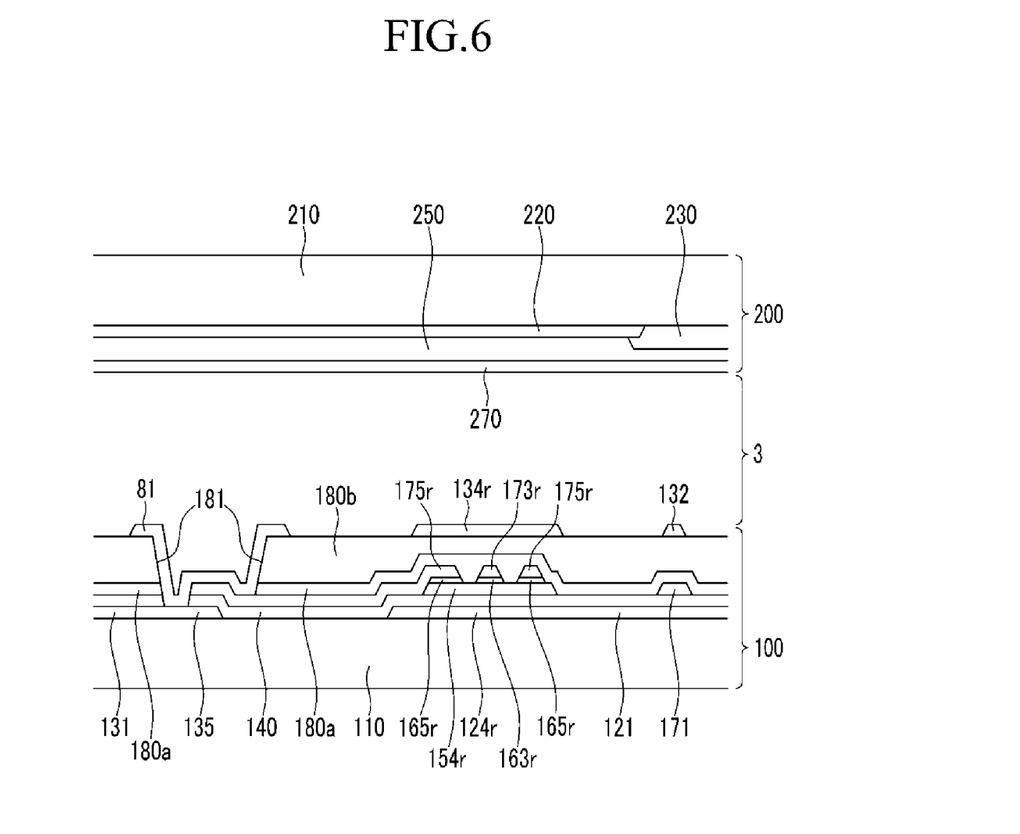
FIG. 6 is a cross-sectional view taken along the line VI-VI of the display device of FIG. 4.

Next, a detailed structure of a display device according to an exemplary embodiment of the present disclosure will be described with reference to FIGS. 4 to 6.

Figure 4:
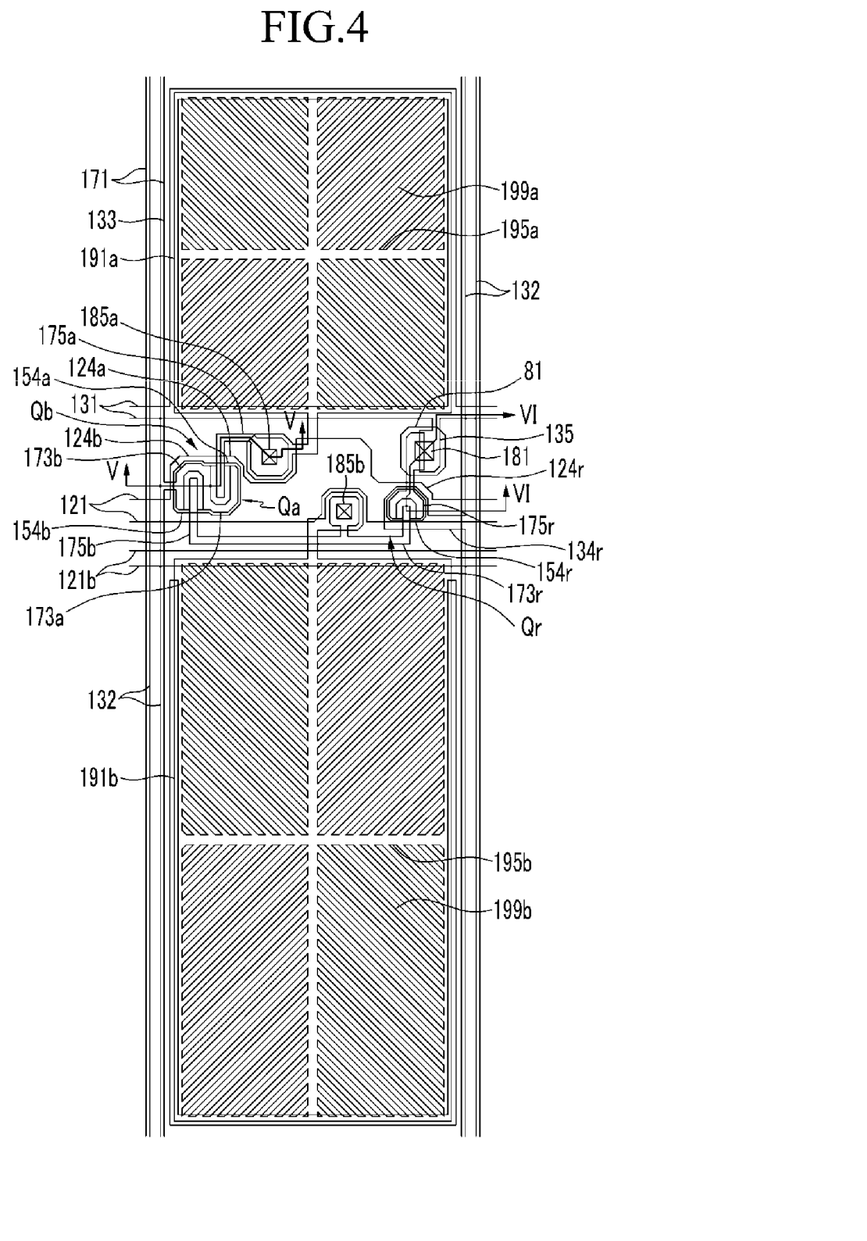
FIG. 4 is a top plan layout view illustrating a pixel unit of the display device according to an exemplary embodiment.

FIG. 4 is a top plan layout view illustrating a pixel of the display device according to the exemplary embodiment. FIG. 5 is a cross-sectional view taken along the line V-V of the display device of FIG. 4. FIG. 6 is a cross-sectional view taken along the line VI-VI of the display device of FIG. 4.

The display device according to the exemplary embodiment may include a lower panel 100 and an upper panel 200 that face each other, a liquid crystal layer 3 inserted between the two display panels 100 and 200, and a pair of polarizer (not illustrated) that are bonded outside the display panels 100 and 200.

First, describing the lower panel 100, a gate conductor including a plurality of gate lines 121 and a first reference voltage line 131 is disposed on an electrically insulating and light-passing substrate 110.

The gate line 121 includes a first gate electrode 124a, a second gate electrode 124b, and a third gate electrode 124r (corresponding to respective transistors Qa, Qb and Qr).

The first reference voltage line 131 (FIG. 6) transmits the first reference voltage Vst1. The first reference voltage Vst1 may be variously controlled as described above.

For example, the first reference voltage Vst1 may be an AC voltage and may be an AC voltage that swings between the high reference voltage Vst1_H that is equal to or greater than the maximum voltage Vd_max of the data voltage and the low reference voltage Vst1_L that is equal to or less than the minimum voltage Vd_min of the data voltage The high reference voltage Vst1_H may be approximately 12V and the low reference voltage Vst1_L may be approximately −2V. The swing period of the first reference voltage Vst1 may be one frame.

According to another exemplary embodiment of the present invention, the first reference voltage Vst1 may also be a DC voltage. For example, the first reference voltage Vst1 may be predetermined voltage such as common voltage Vcom, and the like.

The first reference voltage line 131 may include a protrusion 135 extending such that opening (contact hole) 181 communicates with that protrusion 135.

A gate insulating layer 140 is disposed on the gate conductor and a semiconductive layer including a first semiconductor 154a, a second semiconductor 154b, and a third semiconductor 154r is disposed on the gate insulating layer 140. The first semiconductor 154a and the second semiconductor 154b may be interconnected.

A plurality of ohmic contacts 163a, 163b, 163r, 165a, 165b, and 165r may be disposed on the semiconductive layer.

A plurality of data lines 171 including a first source electrode 173a and a second source electrode 173b and the data conductor including a first drain electrode 175a, a second drain electrode 175b, a third source electrode 173r, and a third drain electrode 175r are respectively disposed on the ohmic contacts 163a, 163b, 163r, 165a, 165b, and 165r and the gate insulating layer 140. The first source electrode 173a and the first drain electrode 175a face each other, the second source electrode 173b and the second drain electrode 175b face each other, and the third source electrode 173r and the third drain electrode 175r face each other.

The first source electrode 173a and the second source electrode 173b are interconnected and the second drain electrode 175b and the third source electrode 173r are interconnected. One end portion that does not face the third source electrode 173r is an end portion of the third drain electrode 175r and it may be extended adjacent to or overlapping a part of the protrusion 135 of the first reference voltage line 131. Thus the drain of the divider-forming switching element Qr is connected to the first reference voltage Vst1.

A passivation layer is disposed on the data conductor and the exposed portions of the semiconductors 154a, 154b, and 154r. The passivation layer may be formed of a single layer, but as illustrated in FIGS. 5 and 6, may include a lower passivation layer 180a and an upper passivation layer 180b. The lower passivation layer 180a and the upper passivation layer 180b include contact holes 185a and 185b that respectively expose the first drain electrode 175a and the second drain electrode 175b and the gate insulating layer 140. The lower and upper passivation layers 180a and 180b may include a contact hole 181 that exposes a part of the third drain electrode 175r and a part of the protrusion 135 of the first reference voltage line 131 that are adjacent to each other or overlap each other.

A first subpixel electrode 191a and a second subpixel electrode 191b, a second reference voltage line 132, and contact assistants 81 are disposed on the upper passivation layer 180b.

The first subpixel electrode 191a and the second subpixel electrode 191b may be spaced apart to face each other, having the gate line 121 (and the Vst1 carrying line 131) extending horizontally therebetween. The first and second subpixel electrodes 191a and 191b may each include cross stem parts 195a and 195b and a plurality of fine stem parts 199a and 199b that extend from the cross stem parts 195a and 195b as shown.

An area of the second subpixel electrode 191b may be equal to or larger than that of the first subpixel electrode 191a.

The respective first subpixel electrode 191a and the second subpixel electrode 191b are physically and electrically connected to the first drain electrode 175a and the second drain electrode 175b, respectively, through the respective contact holes 185a and 185b. The first subpixel electrode 191a may be applied with the data voltage from the first drain electrode 175a. The second subpixel electrode 191b may be applied with the divided voltage between the data voltage transmitted through the second drain electrode 175b and the first reference voltage Vst1.

The third drain electrode 175r and the protrusion 135 of the first reference voltage line 131 may be interconnected through contact assistants 81 in the contact hole 181.

The second reference voltage line 132 may transmit the second reference voltage Vst2 and may be parallel with the data line 171. In more detail, the second reference voltage line 132 may be disposed in a higher layer (that of the pixel electrodes) and it thus may vertically extend, overlapping but being insulated from the data line 171. The second reference voltage line 132 includes a fourth gate electrode 134r that extends toward the third thin film transistor Qr. The fourth gate electrode 134r overlaps an upper portion of the channel that is formed on the third semiconductor 154r between the third source electrode 173r of the third thin film transistor Qr and the third drain electrode 175r. The fourth gate electrode 134r may face the third gate electrode 124r with respect to the third semiconductor 154r.

While the second reference voltage line 132 may overlap a data line 171, one or more insulative layers 18a, 180b are provided to reduce capacitive coupling between the data line 171 and the second reference voltage line 132. At the same time the second reference voltage line 132 may act as a shield to reduce signal coupling between the data line 171 and subpixel electrodes 191a and the 191b of the adjacent pixel PX.

The first subpixel electrode 191a, the second subpixel electrode, the second reference voltage line 132, and the contact assistants 81 may be formed of conductive materials such as ITO, IZO, and the like.

The first gate electrode 124a, the first source electrode 173a and the first drain electrode 175a form the first thin film transistor Qa as the first switching element together with the first semiconductor 154a. Similarly, the second gate electrode 124b, the second source electrode 173b and the second drain electrode 175b form the second thin film transistor Qb as the second switching element together with the second semiconductor 154b. The third gate electrode 124r, the fourth gate electrode 134r, the third source electrode 173r and the third drain electrode 175r form the third thin film transistor Qr as the diving switching element together with the third semiconductor 154r.

The channels of the first thin film transistor Qa, the second thin film transistor Qb, and the third thin film transistor Qr are each formed on the first, second, and third semiconductors 154a, 154b, and 154r among first, second, and third source electrodes 173a, 173b, and 173r and the first, second, third drain electrodes 175a, 175b, and 175r.

It is possible to control the amount, direction, and the like, of leakage current at different times through the third thin film transistor Qr by controlling the magnitude of the second reference voltage Vst2 together with the magnitude of the first reference voltage Vst1 at those times. For example, the magnitude of the second reference voltage Vst2 may be the threshold voltage Vth or more of the third thin film transistor Qr and may be larger than 0V. The second reference voltage Vst2 may be voltage so that the third thin film transistor Qr is operated in the linear region when it is desirable to have current passing through it.

According to another exemplary embodiment of the present invention, the second reference voltage Vst2 may be a DC voltage between approximately −12V and approximately −2V or an AC voltage that swings between approximately −12V and approximately −2V. The first reference voltage Vst1 and the second reference voltage Vst2 turn off, for example, the third thin film transistor Qr so that the leakage current through the third thin film transistor Qr may be substantially 0.

Describing the upper panel 200, a light blocking member 220 and a color filter 230 may be disposed on an insulating substrate 210. At least one of the light blocking member 220 and the color filter 230 may also be disposed on the lower panel 100.

A planarized overcoat 250 may be disposed on the color filter 230 and the light blocking member 220, but the overcoat 250 may be omitted.

An opposed electrode 270 is disposed on the overcoat 250.

Alignment layers (not shown) are disposed on both surfaces of the display panels 100 and 220, which may be a vertical alignment layer.

The first subpixel electrode 191a forms a first liquid crystal capacitor Clca together with the opposed electrode 270 and the second subpixel electrode 191b forms a second liquid crystal capacitor Clcb together with the opposed electrode 270, thereby maintaining the charged voltage.

The second reference voltage line 132 of the lower panel 100 overlaps the data line 171 to reduce the capacitive coupling between the data line 171 and the opposed electrode 270 of the upper panel 200.

Next, an effect of the display device according to an exemplary embodiment of the present invention will be described with reference to FIGS. 7 and 8.

Figure 7:
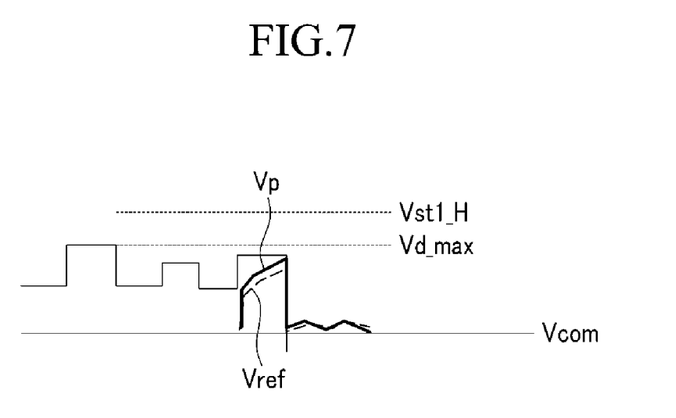
FIGS. 7 and 8 are respective timing diagrams for first and second polarity states and illustrating a change in the driving signals and in the pixel electrode voltage for one frame of the display device according to the exemplary embodiment.
Figure 8:
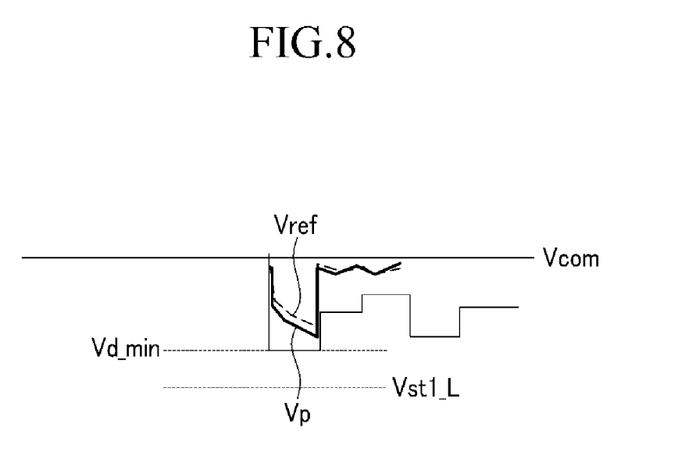

FIGS. 7 and 8 are timing diagrams illustrating a change in a driving signal and a pixel voltage for one frame of the display device according to the exemplary embodiment of the present invention.

Referring to FIG. 7, as described above, when the data voltage is a positive polarity frame (positive with respect to the common voltage Vcom), the value of the first reference voltage Vst1 may be the high reference voltage Vst1_H that is equal to or greater than the maximum voltage Vd_max of the data voltage. Therefore, charging voltage Vp of a second liquid crystal capacitor Clcb may have a value more than the existing Vref in the positive polarity frame. Therefore, in the case of the normally black mode of operation, the luminance of the second subpixel PXb may be increased more toward white by driving the second subpixel 191b to a voltage level exceeding that (Vref) of the first subpixel 191a.

Referring to FIG. 8, as described above, when the data voltage is a negative frame with respect to the common voltage Vcom, the value of the first reference voltage Vst1 may be the low reference voltage Vst1_L that is equal to or less than the minimum voltage Vd_min of the data voltage. Therefore, the charging voltage Vp of a second liquid crystal capacitor Clcb may have a value lower than the existing Vref in the negative polarity frame. Therefore, in the case of the normally black mode, the luminance of the second subpixel PXb may be increased toward white by driving the second subpixel 191b to a voltage level below that (Vref) of the first subpixel 191a.

Next, referring to FIG. 9, an example in which the first reference voltage line 131 and the second reference voltage line 132 of the display device according to the exemplary embodiment of the present invention are disposed will be described.

Figure 9:
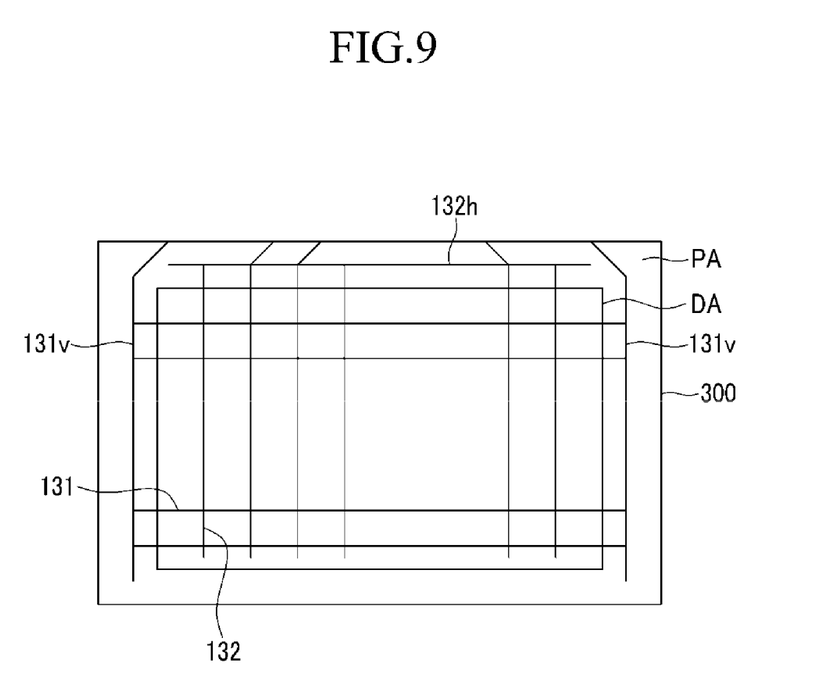
FIG. 9 is a block diagram illustrating the display device according to an exemplary embodiment.

FIG. 9 is a block diagram illustrating (without all driving chips and detailed interconnects being shown) the display device according to the exemplary embodiment of the present invention.

Referring to FIG. 9, the display panel 300 of the display device according to the exemplary embodiment of the present invention may include a display area DA that displays an image and a peripheral area PA therearound, where the PA does not display part of the image. As described above, the plurality of first reference voltage lines 131 (Vst1) and the second reference voltage line 132 (Vst2) are disposed in the display area DA to respectively extend parallel to the gate lines (for lines 131) or overlapping the data lines (true for lines 132).

More specifically, the plurality of first reference voltage lines 131 may extend in a row direction like the gate lines 121 G1 to Gn but spaced apart from and in the same layer as the gate lines. On the other hand, the plurality of second reference voltage lines 132 may extend in a column direction like the data lines 171 D1 to Dm and overlapping but insulatively disposed in a layer above that of the data lines.

The plurality of first reference voltage lines 131 may be interconnected to each other through at least one first connection line 131v in the peripheral area PA. The first connection line 131v may be disposed on at least one side with respect to the display area DA. The first connection line 131v may extend in a column direction to intersect with and connect to a corresponding plurality of the horizontally extending first reference voltage lines 131 (Vst1).

The plurality of second reference voltage lines 132 may be interconnected through a second connection line 132h in the peripheral area PA. The second connection line 132h may be disposed on at least one side with respect to the display area DA, more detail, the side on which the data driver 500 is disposed. The second connection line 132h may extend in a row direction to intersect with and connect to a corresponding plurality of the vertically extending second reference voltage lines 132 (Vst2).

The first connection line 131v and the second connection line 132h may respectively receive the first reference voltage Vst1 and the second reference voltage Vst2 through a flexible printed circuit film or a printed circuit board (PCB) connected to the display panel 300.

While this disclosure of invention has been described in connection with what is presently considered to be practical exemplary embodiments, it is to be understood that the present teachings invention is not limited to the disclosed embodiments, but, on the contrary, is intended to cover various modifications and equivalent arrangements included within the spirit and scope of the present teachings.

What is claimed is:

1. A display device, comprising: a gate line configured for transmitting a gate signal; a data line configured for transmitting a data voltage; a first reference voltage providing line configured for transmitting a corresponding first reference voltage signal; a second reference voltage providing line configured for transmitting a corresponding second reference voltage signal; a first switching element and a second switching element, each operatively coupled to the gate line and to the data line; a third switching element operatively coupled to the second switching element and to first and second terminals providing the first and second reference voltage signals, respectively, the first and second terminals being connected to or being parts of the first and second reference voltage providing lines, respectively; a first liquid crystal capacitor connected to the first switching element; and a second liquid crystal capacitor connected to the second switching element, wherein the third switching element includes a first control terminal connected to the gate line and a second control terminal connected to the second terminal that provides the second reference voltage signal.

2. The display device of claim 1, wherein: the first control terminal and the second control terminal face each other with respect to an interposed channel region of the third switching element.

3. The display device of claim 2, wherein: the first reference voltage signal includes an AC voltage component and the second reference voltage signal includes a DC voltage component.

4. The display device of claim 3, wherein: the first reference voltage signal has opposed polarity portions respectively corresponding to inverted frames of the display device.

5. The display device of claim 4, wherein: the first reference voltage signal is provided by a first reference voltage signal source circuit that causes the first reference voltage signal to swing between a predetermined high reference voltage level that is equal to or greater than a maximum voltage of the data voltage and a predetermined low reference voltage level that is equal to or less than a minimum voltage of the data voltage.

6. The display device of claim 5, wherein: the first reference voltage is the high reference voltage when the data voltage is positive with respect to a common voltage and is the low reference voltage when the data voltage is negative with respect to the common voltage.

7. The display device of claim 6, wherein: the second reference voltage signal is caused to be equal to or greater than a threshold voltage of the third switching element.

8. The display device of claim 7, wherein: the high reference voltage level is approximately 12V and the low reference voltage level is approximately −2V.

9. The display device of claim 2, wherein: the first reference voltage signal includes a DC voltage component.

10. The display device of claim 9, wherein: the second reference voltage signal includes a voltage that is capable of turning off the third switching element.

11. The display device of claim 10, wherein: the second reference voltage signal includes a DC voltage or an AC voltage having a value from approximately −12V to approximately −2V.

12. The display device of claim 2, wherein the second reference voltage providing line overlaps the data line.

13. The display device of claim 12, wherein: the second liquid crystal capacitor includes a corresponding second subpixel electrode that is disposed in a layer above a layer in which the second switching device is disposed, wherein the second reference voltage providing line and the second subpixel electrode are disposed in a same layer.

14. A driving method for a display device including a first switching element and a second switching element connected to a gate line and a data line; a third switching element connected between the second switching element and a terminal of a first reference voltage providing line; a first liquid crystal capacitor connected to the first switching element; and a second liquid crystal capacitor connected to the second switching element, the method comprising: applying a data voltage to the first liquid crystal capacitor by switching the first switching element into a conductive state, and at the same time switching the second switching element into a conductive state, and switching the third switching element into a conductive state such that the second and third switching element form a voltage dividing network and applying a divided voltage of the voltage dividing network to the second liquid crystal capacitor; and at a different time, switching the first switching element and the second switching element into respective non-conductive states and controlling leakage current of the third switching element to be below a predetermined maximum level, wherein the third switching element includes a first control terminal connected to the gate line and a second control terminal connected to a terminal of a second reference voltage providing line, and the controlling of the leakage current of the third switching element includes controlling at least one of the first reference voltage and the second reference voltage.

15. The driving method of claim 14, wherein: the first control terminal and the second control terminal face each other with respect to a channel portion of the third switching element.

16. The driving method of claim 15, wherein: the first reference voltage includes an AC voltage component, and the second reference voltage includes a DC voltage component.

17. The method of claim 16, wherein: the first reference voltage has polarity inverted by frames.

18. The driving method of claim 17, wherein: the first reference voltage swings between a high reference voltage that is equal to or greater than a maximum voltage of the data voltage and a low reference voltage that is equal to or less than a minimum voltage of the data voltage.

19. The driving method of claim 15, wherein: the first reference voltage includes a DC voltage component.

20. The driving method of claim 19, wherein: the second reference voltage includes a voltage level that is capable of turning off the third switching element.

* * * * *